United States Patent
Hidari

[11] Patent Number: 5,905,533
[45] Date of Patent: May 18, 1999

[54] IMAGE PROCESSING APPARATUS

[75] Inventor: Hirofumi Hidari, Kawasaki, Japan

[73] Assignee: Nikon Corporation, Tokyo, Japan

[21] Appl. No.: 08/062,768

[22] Filed: May 18, 1993

[30] Foreign Application Priority Data

May 20, 1992 [JP] Japan ................................. 4-127653
Jun. 11, 1992 [JP] Japan ................................. 4-176019

[51] Int. Cl.⁶ ................................................. H04N 5/238
[52] U.S. Cl. ........................... 348/363; 348/229; 348/364
[58] Field of Search .................................. 348/362, 229,
348/621, 701, 224, 363, 364, 607, 610,
619–620, 627; 364/724.17, 574; H04N 5/225,
5/238

[56] References Cited

U.S. PATENT DOCUMENTS

| | | | |
|---|---|---|---|
| 4,058,836 | 11/1977 | Drewery et al. | 348/620 |
| 4,240,106 | 12/1980 | Michael et al. | 348/621 |
| 4,365,272 | 12/1982 | Nagai | 348/229 |
| 4,639,784 | 1/1987 | Fling | 348/620 |
| 4,652,907 | 3/1987 | Fling | 348/621 |
| 4,884,144 | 11/1989 | Jinnai et al. | 348/362 |
| 4,947,362 | 8/1990 | Bui | 364/724.19 |
| 5,005,082 | 4/1991 | Zdepski et al. | 348/613 |
| 5,140,424 | 8/1992 | Yoshimura et al. | 348/620 |
| 5,264,940 | 11/1993 | Komiya et al. | 348/362 |

*Primary Examiner*—Wendy Garber
*Assistant Examiner*—Andrew B. Christensen
*Attorney, Agent, or Firm*—Shapiro and Shapiro

[57] ABSTRACT

An image processing apparatus comprises a number of times of integration determiner for determining a number of times of integration based on stop information representing a stop value of an image pickup unit for picking up a still object, and an integrator for integrating the still image data produced by the image pickup unit by the number of times determined by the determiner. The apparatus modifies the still image data integrated by the integrator for each integration in accordance with the current number of times of integration and the stop information. In another aspect of the invention, the apparatus comprises a calculator for sequentially and circulatively adding K times (0<K<1) of an input video signal and (1−K) times of a past image signal correlated to the input video signal to reduce a noise component of a still image or a still image area in a motion picture. The apparatus modifies the coefficient K in accordance with an elapsed time from the start of the noise reduction operation at an interval of unit period in which the video signals are correlated to each other or an interval which is an integer multiple of the unit period.

14 Claims, 8 Drawing Sheets

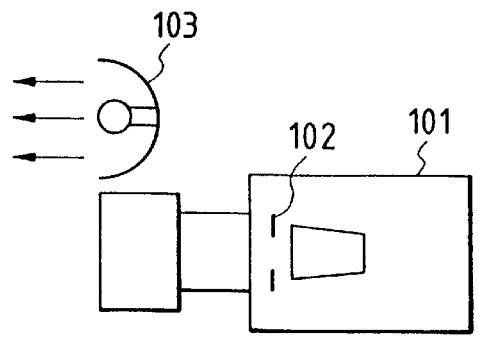
FIG. 3A
PRIOR ART
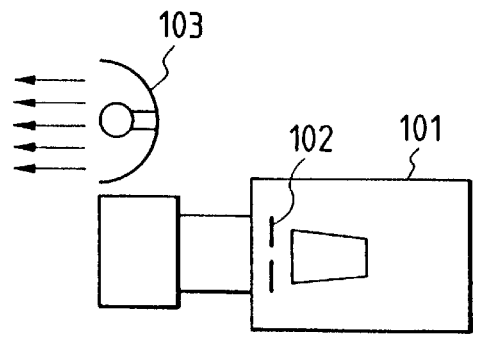
FIG. 3B
PRIOR ART
FIG. 4
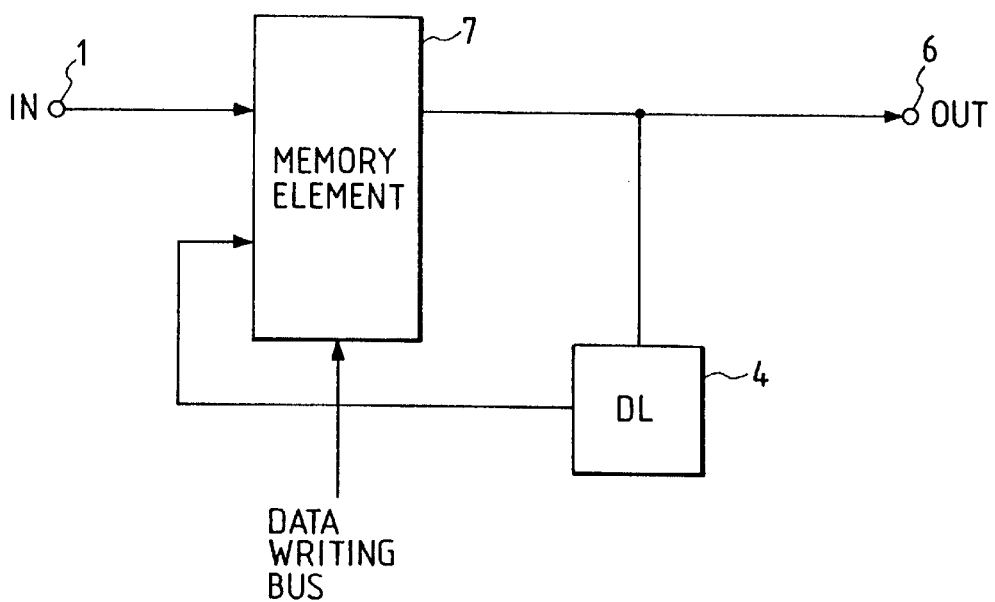

IMAGE PROCESSING APPARATUS

BACKGROUND OF THE INVENTION

1. Field of the Invention

The present invention relates to an image processing apparatus which processes a still image produced by an image pickup device or a still image area in a motion picture.

2. Related Background Art

An image processing apparatus which applies various processing to image data produced by an image pickup unit and outputting it has been known. In this type of apparatus, as shown in FIGS. 3A and 3B, in order to increase an object field depth of the image pickup unit 101, a diaphragm 102 is stopped down from a proper stop value shown in FIG. 3A to a position shown in FIG. 3B. Usually, since a level of an image signal of the image pickup unit 101 is lowered by the stop-down, an illumination of a light source 103 for illuminating the object as shown in FIG. 3B is increased by an amount corresponding to the reduction of the level of the image signal.

However, as the brightness of the illumination light source is increased, it may adversely affect to the object. Further, where a natural light is used as the illumination light source, it is not possible to increase the illumination.

In another type of image processing apparatus, image signals at different time points correlated to each other are circulatively summed to reduce a noise. This is referred to as a circulation type noise reduction apparatus.

A prior art apparatus of this type is configured as shown in FIG. 10, in which a video signal applied to an input terminal 1 is multiplied by a multiplier 2 by a factor of K, where K is $0 \leq K \leq 1$. An output of the multiplier 2 is outputted through an adder 3 and it is also supplied to a unit delay element 4. An output of the unit delay element 4 is delayed by one frame by a frame memory, multiplied by a multiplier 5 by a factor of (1−K), and supplied to the adder 3 where it is summed with the signal from the input terminal 1. In general, since noises of the same pixel are not correlated between frames, the noise component of the video signal is reduced by repeating the above operation.

In the prior art described above, since the factor K is fixedly set in accordance with the amount of noise component included in the video signal, the following problem arises.

Assuming that K=½, the number of times of circulative addition and the degree of reduction of noise are considered. In an initial state (which is defined as a first circulative addition), the video signal applied to the input terminal 1 is produced from the output terminal 6 as it is. In a second addition by the adder 3, ½ time of the input video signal and ½ time of the video signal of the same pixel of one frame older are summed. An amplitude component of the noise in the output of the adder 3 is given by $$\sqrt{\{(KN)^2 + [(1-K)N]^2\}}$$

where N is an amplitude component of the noise in the video signal. The first term in represents a noise power of the output of the multiplier 2, and the second term represents a noise power of the output of the multiplier 5. Since K=½, $$\sqrt{\{(N/2)^2 + (N/2)^2\}} = N/\sqrt{2}$$

Namely, the noise is reduced by the factor of $1/\sqrt{2}$. Hereinafter, the value corresponding to $1/\sqrt{2}$ is defined as a noise reduction factor.

The noise reduction factors when K=½ are sequentially calculated as follows:

| Number of times of addition | Noise reduction factor |
|---|---|
| 2 | $1/\sqrt{2}$ |
| 3 | $\sqrt{(3/8)}$ |
| 4 | $\sqrt{(11/32)}$ |
| 5 | $\sqrt{(43/128)}$ |

The result of calculation for K=½ is graphed as shown in FIG. 6. Similar calculations were made for K=⅔ and K=¹⁄₁₀ and the results are shown in FIG. 6.

As seen from FIG. 6, when K is large, the convergence of the noise reduction factor is fast but a convergence value is large and the noise reduction effect is small. On the other hand, when K is small, the convergence value of the noise reduction factor is small, but the convergence is slow. Thus, in the prior art noise reduction apparatus, it is not possible to quickly and sufficiently reduce the noise of the still image.

SUMMARY OF THE INVENTION

In accordance with one aspect of the present invention, the image processing apparatus corrects a change in the level of the image signal in accordance with a change in the stop value of the image pickup device to produce an image signal of the same level as that for the proper stop value.

The image processing apparatus comprises: number of times of integration determination means for determining a number of times of integration in accordance with stop value information indicating the stop status of image pickup means for picking up an image of a still object; integration means for integrating still image data produced by the image pickup means by the number of times of integration determined by the number of times of integration determination means; and modification means for modifying the still image data integrated by the integration means for each integration in accordance with the current number of times of integration and the stop value information.

In the image processing apparatus of the present invention, when the diaphragm of the image pickup means for picking up the still object is stopped down from a proper stop value, the still image data produced by the image pickup means is integrated by the number of times of integration determined in accordance with the stop value information, and the integrated still image data is modified for each integration in accordance with the number of times of integration and the stop value information. As a result, the level of the output signal of the still image is same as that of the signal level for the proper stop value.

In accordance with a second aspect of the present invention, the image processing apparatus has a fast convergence speed of noise reduction and a low convergence in a noise reduction operation by the cumulative addition.

The image processing apparatus comprises operation means for sequentially and circulatively add K times the input video signal, where K is a coefficient, and (1−K) times the past image signal which is correlated to the input video signal and performs the reduction of a noise component of a still image or a still image area in a motion picture. The coefficient K is changed at an interval of a unit period in which the video signals are correlated or at an interval which is an integer multiple of the unit period.

Preferred examples of changing the coefficient K are described below.

1) The coefficient K is changed such that a relation of $K_{n+1} \leq K_n$ is met between a coefficient $K_n$ in an n-th circulative addition and a coefficient $K_{n+1}$ in a (n+1)th circulative addition, where the initial state is defined as a first circulative addition.

2) In addition to the condition 1) above, the relation of $K_{n+1} = K_n$ does not continue until after at least the fourth circulative addition.

3) The coefficient K is set to meet the following conditions 1–3 assuming that the initial state is defined as the first circulative addition.

1) A coefficient in the initial state is 1.

2) A coefficient at the $2^x$-th (where x is a positive integer) circulative addition is $\frac{1}{2}^x$.

3) A relation of $K_{n+1} \leq K_n$ is met between the coefficient $K_n$ in the n-th (where n is a positive integer) circulative addition and the coefficient $K_{n+1}$ in the (n+1)th circulative addition.

4) The coefficient K is set to $K_n = 1/n$ where K is the coefficient in the n-th circulative accumulation and the initial state is defined as the first circulative addition.

The operation means may comprise one or more memory elements for retrievably storing data of the input video signal, the video signal of the past image to be added to the input video signal, and sum data of K times the input video signal and (1−K) times the video signal of the past image signal.

The image processing apparatus may further comprise detection means for detecting a noise level of the still image or the still area in the motion picture. The coefficient K is fixed at the time when the noise level detected by the detection means is lower than a predetermined level.

Where K<½Y, where Y is the number of quantized bits of the input video signal, the product is equal to zero even if a full scale signal is applied as the input video signal. Accordingly, K is set larger than ½Y.

In the present invention, the coefficient K which was fixedly set in the prior art is variable. Namely, when the number of times of cumulative addition is small, K is set large so make faster the convergence of noise reduction, and as the number of times of cumulative addition increases, K is lowered to reduce the conversion value of the noise reduction.

For example, when the coefficient K is set such that K=1/n, where K is the coefficient at the n-th cumulative addition, the degrees of the noise reduction are as follows:

| Number of times addition | Degree of noise reduction |
| --- | --- |
| 1 | 1 |
| 2 | $1/\sqrt{2}$ |
| 3 | $1/\sqrt{3}$ |
| 4 | $1/\sqrt{4}$ |
| 5 | $1/\sqrt{5}$ |
| 6 | $1/\sqrt{6}$ |
| 7 | $1/\sqrt{7}$ |

-continued

| Number of times addition | Degree of noise reduction |
| --- | --- |
| 8 | $1/\sqrt{8}$ |
| 9 | $1/\sqrt{9}$ |
| 10 | $1/\sqrt{10}$ |
| ... | ... |

Namely when the circulative addition is performed while K is changed to meet $K_n = 1/n$, the degree of noise reduction at the n-th addition is equal to $1/\sqrt{n}$. This is equivalent to take a sum mean of n images. The degree of noise reduction when $K_n = 1/n$ is also shown in FIG. 6. As seen from FIG. 6, when the change is made to K=1/n, the degree of noise reduction is fast and the convergence value is small.

The coefficient K may be other than K=1/n. For example, it may be set to meet the following conditions.

1) The coefficient at the initial state is 1.

2) The coefficient at the $2^x$-th (where x is a positive integer) circulative addition is $\frac{1}{2}^x$.

3) The relation $K_{n+1} \leq K_n$ is met between the coefficient $K_n$ at the n-th (where n is a positive integer) circulative addition and the coefficient $K_{n+1}$ at the (n+1)th circulative addition.

Three examples in which K is changed to meet the above conditions are shown in Table 1.

TABLE 1

| | K | | | |
| --- | --- | --- | --- | --- |
| n | (a) | (b) | (d) | |
| 1 ($2^0$) | 1 | 1 | 1 | |
| 2 ($2^1$) | 1/2 | 1/2 | 1/2 | ←$1/2^1$ |
| 3 | 1/4 | 1/2 | 1/4 | |
| 4 ($2^2$) | 1/4 | 1/4 | 1/4 | ←$1/2^2$ |
| 5 | 1/8 | 1/4 | 1/4 | |
| 6 | 1/8 | 1/4 | 1/8 | |
| 7 | 1/8 | 1/4 | 1/8 | |
| 8 ($2^3$) | 1/8 | 1/8 | 1/8 | ←$1/2^3$ |
| 9 | 1/16 | 1/8 | 1/8 | |
| 10 | 1/16 | 1/8 | 1/8 | |
| 11 | 1/16 | 1/8 | 1/16 | |
| 12 | 1/16 | 1/8 | 1/16 | |
| 13 | 1/16 | 1/8 | 1/16 | |
| 14 | 1/16 | 1/8 | 1/16 | |
| 15 | 1/16 | 1/8 | 1/16 | |
| 16 ($2^4$) | 1/16 | 1/16 | 1/16 | ←$1/2^4$ |
| 17 | 1/32 | 1/16 | 1/16 | |
| 18 | 1/32 | 1/16 | 1/16 | |
| 19 | 1/32 | 1/16 | 1/16 | |
| 20 | 1/32 | 1/16 | 1/16 | |

The degrees of noise reduction calculated or (a), (b) and (c) of Table 1 are shown in graphs of FIGS. 7–9. It is seen from those figures that the relation between the number of times of circulative addition and the degree of noise reduction is substantially constant so long as the above conditions are met even if the coefficient K at the time not expressed by $2^x$ is different, and the same noise reduction effect as that for $K_n = 1/n$ (FIG. 6) is attained.

Embodiments of the present inventions are now explained with reference to the drawings.

BRIEF DESCRIPTION OF THE DRAWINGS

FIGS. 3A and 3B are diagrams illustrating a relation between a stop value of an image pickup unit and an illumination light source;

FIG. 4 shows a block diagram of a configuration of an image processing apparatus in accordance with a second aspect of the present invention;

DETAILED DESCRIPTION OF THE PREFERRED EMBODIMENTS

I First, an embodiment of the image processing apparatus in accordance with one aspect of the present invention is explained.

Figure 1:
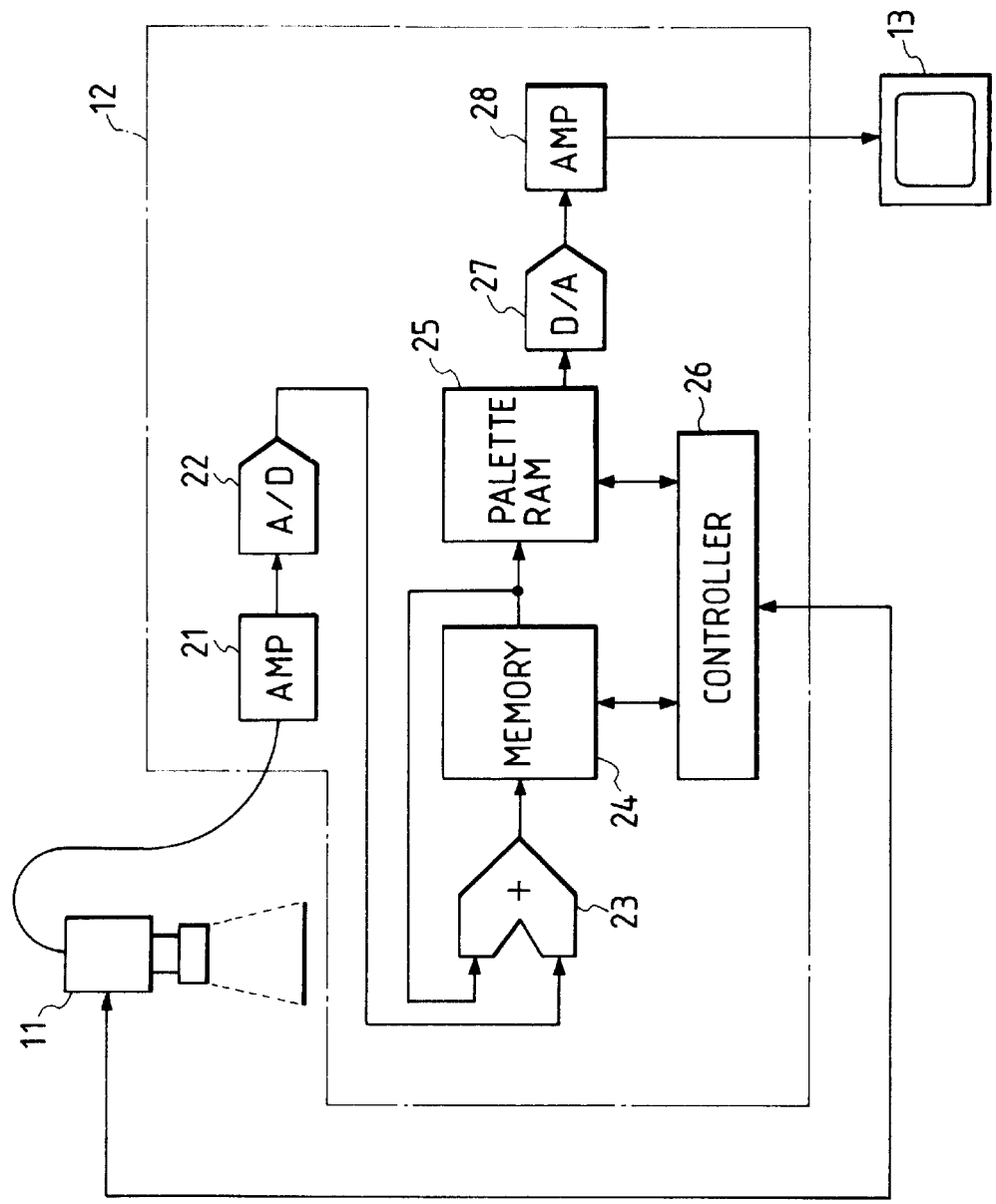
FIG. 1 shows a block diagram of a configuration of one embodiment in accordance with one aspect of the present invention.

FIG. 1 shows one embodiment. In the present embodiment, a document sheet is picked up by a TV camera 11, and the picked-up still image data is processed by an image processing apparatus 12 for displaying on a monitor 13. In FIG. 1, numeral 21 denotes an input amplifier which amplifies a still image signal picked up by the TV camera 11. It is now assumed that the still image data is 8-bit data. Numeral 22 denotes an 8-bit A/D converter which converts the still image signal amplified by the input amplifier 21 to 8-bit digital still image data. Numeral 23 denotes an adder which adds to the latest still image data supplied from the A/D converter 22 the integration of the past still image data (hereinafter referred to as the integrated still image data) stored in an image memory 24, and supplies the sum to the image memory 24. The image memory 24 is an 8-bit memory which stores the integrated still image data.

Numeral 25 denotes an 8-bit palette RAM. When the stop value of the TV camera 11 is stopped down from a proper stop value in order to increase the depth of object field, the output of the palette RAM 25 is changed for each integration in accordance with the number of times of integration and the stopped-down value.

Assuming that the number of times of integration is now n and the stepped-down value from the proper stop value is a, the output for each integration is set to $2^a/n$ times the input. Namely, at the start of the integration (first integration), the still image data reduced by a factor of $1/2^a$ by the stop-down is multiplied by a factor of $2^a$, and at the second integration, the integrated still image data of $2/2^a$ is multiplied by a factor of $2^a/2$. Similarly, at the n-th integration, the integrated still image data reduced by a factor of $n/2^a$ is multiplied by a factor of $2^a/n$. The number of times of integration N is determined based on the stopped-down value a. Namely, N=2. When the stop-down is not made, it is set such that the input and output data of the palette RAM are equal.

Numeral 26 denotes a system controller which controls the respective units in the image processing apparatus 12 and communicates with the TV camera 11 to receive the proper stop value and the stopped-down value a. The communication of the information is carried out automatically in the present embodiment although it may be entered by an operator. Numeral 27 denotes an 8-bit D/A converter which converts the 8-bit digital still image data supplied from the palette RAM 25 to an analog still image signal. Numeral 28 denotes an output amplifier which amplifies the analog still image signal supplied from the D/A converter 27 and supplies it to the monitor 13 for image display.

Figure 2:
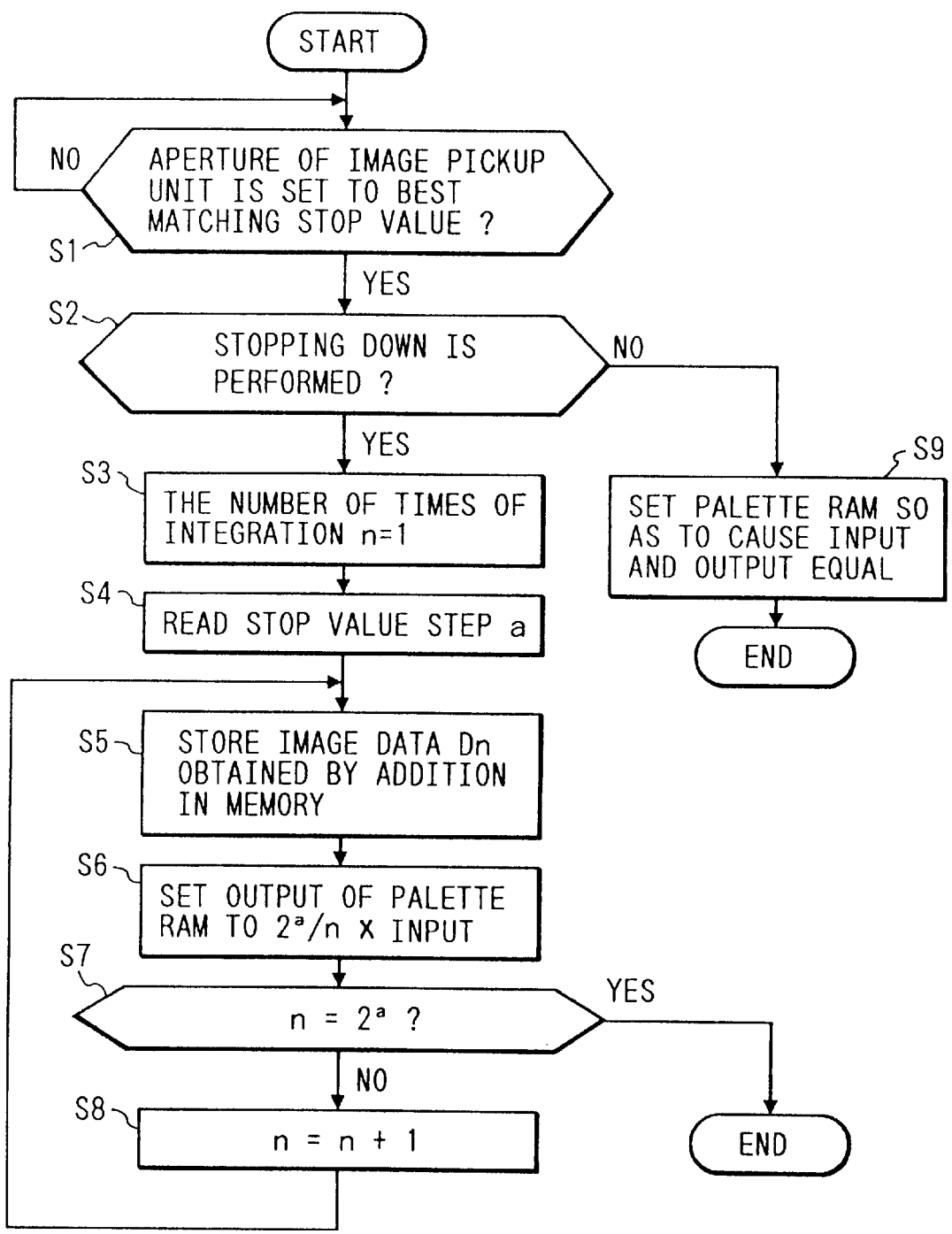
FIG. 2 shows a flow chart of an image processing operation of a system controller.

FIG. 2 shows a flow chart of an operation of the system controller 26. An operation of the image processing apparatus of the present invention is explained with reference to the flow chart.

First, in a step S1, stop value information is read from the TV camera 11 and whether the stop has been stopped down to a proper stop value or not is determined. If it has been set, the process proceeds to a step S2 to determine whether the stop-down has been carried out or not to increase the depth of object field. If it has been done, the process proceeds to a step S3, and if not, the process proceeds to a step S9.

In the step S3, a register which indicates the number of times of integration is set to "1". In the following step S4, the stopped-down value a is read from the TV camera 11.

As mentioned earlier, the still image signal picked up by the TV camera 11 is amplified by the input amplifier 21, converted to the 8-bit digital still image data by the A/D converter 22, and supplied to the adder 23. In the adder 23, the previous integrated still image data stored in the image memory 24 is added to the latest still image data.

The system controller 26 stores the summed image data Dn (where n is the number of times of integration) into the image memory in a step S5. In a step S6, it controls the palette RAM 25 such that the output of the palette RAM 25 is equal to $2^a/n$ of the input.

At the start of the integration (n=1), the still image data D1 applied to the image processing apparatus is stored in the image memory 24 as it is through the adder 23, and it is also supplied to the palette RAM 25. Since the palette RAM is set such that the output thereof is $2^a$ times the input thereto, the first still image data D1 is multiplied by $2^a$ and it is supplied to the D/A converter 27 where it is converted to the analog still image signal and amplified by the amplifier 28, and displayed on the monitor 13.

For example, when the stop-down value a of the TV camera 11 is "4", the output of the palette RAM 25 at the start of the integration is set to $2^4=16$ times of the input thereto. Since the still image signal produced by the TV camera 11 when the stopped-down value is "4" is equal to $1/16$ of the signal level for the proper stop value, the stopped-down still image data is multiplied by 16 before it is displayed so that an image of a proper brightness is displayed.

In the second integration, the second picked-up still image data D2 is added to the first still image data D1 stored in the image memory 24 by the adder 23 and the integrated still image data D1+D2 is stored in the image memory 24 and it is also supplied to the palette RAM 25. Since the palette RAM is set such that the output thereof is equal to $2^a/2$ of the input, the second integrated still image data D1+D2 is multiplied by the factor of $2^a/2$ and supplied to the D/A converter 27 where it is converted to the analog still image signal, amplified by the output amplifier 28 and displayed by the monitor 13.

At the second integration when the stopped-down value is "4", the output of the palette RAM 25 is set to $2^4/2=2^3=8$ times of the input. The image signal level picked up by the TV camera 11 is inversely proportional to the stop-down value a, and after the stop-down, the image signal level is constant unless the photographing condition such as illumination changes. The signal levels of the first and second integrated still image data D1 and D2 are equal to 1/16 of the signal level for the proper stop value, and the signal level of the summed integrated still image data D1+D2 is equal to 1/16×2=1/8. Accordingly, an image of a proper brightness is produced by multiplying the integrated still image data D1+D2 at the stopped-down value and displaying it on the monitor.

Similarly, in the n-th integration, the n-th picked up still image data Dn is added to the up to (n−1)th integrated still image data D1+D2+ . . . +Dn−1 stored in the image memory 24 by the adder 23, and the integrated still image data D1+D2 + . . . + Dn is stored in the image memory 24 and it is also supplied to the palette RAM 25. Since the palette RAM 25 is set such that the output thereof is equal to $2^a/n$ of the input, the n-th integrated still image data D1+D2+ . . . + Dn is multiplied by the factor of $2^a/n$ and it is supplied to the D/A converter 27 where it is converted to the analog still image signal, and it is amplified by the output amplifier 28 and displayed on the monitor 13.

At the n-th integration when the stop-down value is "4", the palette RAM 25 is set such that the output thereof is $2^4/n=16/n$ times of the input. On the other hand, the signal level of the integrated still image data D1+D2+ . . . + Dn at the stopped-down value is equal to 1/16×n=n/16 of the signal level at the proper stop value. Accordingly, an image of a proper brightness is displayed on the monitor 13 by multiplying the integrated still image data D1+D2+ . . . + Dn at the stopped-down value by the factor of 16/n.

Turning back to the flow chart of FIG. 2, in a step S7, whether the number of times of integration n has reached $2^a$ or not is determined. If it has, the process is terminated, and if it has not, the process proceeds to a step S8 to increment the number of times of integration n. Then, the process proceeds to the step S5.

In the step 2, if the stop-down was not made in the TV camera 11, the palette RAM 25 is controlled such that the input and the output of the palette RAM 25 are equal. Then, the process is terminated.

As described above, when the stop-down is made in the TV camera 11 from the proper stop value, the input still image data are integrated by the number of times of integration N determined by the stopped-down value a, and the integrated still image data is modified for each integration in accordance with the number of times of integration N and the current stopped-down value a. Accordingly, even if the TV camera 11 is stopped down in order to increase the depth of object field, the image signal of the same signal level as that for the proper stop value is produced and a bright image is displayed on the monitor 13.

The still image data applied to the image processing apparatus includes some noise component which randomly overlaps on the still image data. As described above, since the image components in the still image data are identical, when the still image data is integrated, the image component is amplified, but the noise components are not amplified because they have a very low correlation between data. Accordingly, by integrating the low level still image data at the stopped-down value, the noise is relatively reduced.

In the present embodiment, the still image data is 8-bit data and the A/D converter 22, the image memory 24, the palette RAM 25 and the D/A converter 26 are also 8-bit units, although the present invention is not limited thereto.

In the present embodiment, the output of the palette RAM 25 is modified for each integration. Alternatively, this operation may be carried out by the AMP (28) of FIG. 1. In this case, the palette RAM 25 is not necessary and the amplification factor of the AMP 28 is controlled by the controller 26 for each integration.

In the above description, when the stop-down value is "4," the image data is reduced by the factor of 1/16 by the stop-down from the proper stop value. At an intermediate stop value, the reduction may be 1/3, for example. In such a case, the output of the palette RAM 25 is multiplied by the factor of 3 at the first integration, 3/2 times at the second integration and 1 time at the third integration to attain the same effect as that described above. In this case, the number of times of integration is determined by the comparison of the image data at the proper stop value and the stopped-down value. Namely, if the output level of the image pickup unit 11 is reduced by the stop-down by the factor of 1/3, three times of integration is needed.

In the image processing apparatus described above, the still image data produced by picking up the still object is integrated by the number of times determined based on the stop-down information of the image-pickup means, and the integrated still image data is modified for each integration in accordance with the number of times of integration and the stop-down information. Accordingly, even if the image pickup means is stopped down in order to increase the depth of object field, the image signal having the same signal level as that for the proper stop value is produced and the bright image is displayed on the monitor.

Further, the noise is relatively decreased by integrating the low level still image data at the stopped-down value.

Embodiments of the image processing apparatus in accordance with a second aspect of the present invention are now explained.

Figure 10:
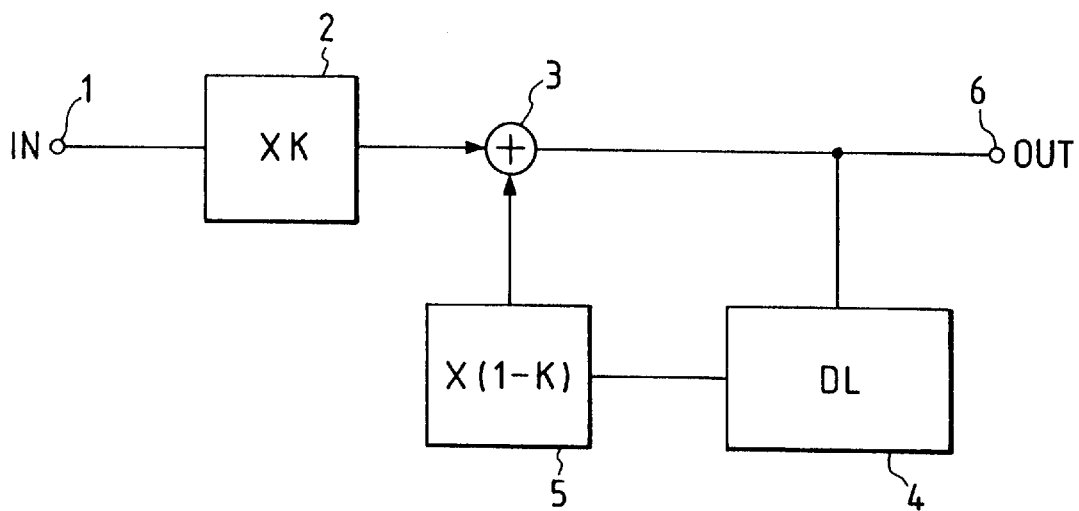
FIG. 10 shows a block diagram of a configuration of a prior art circulation type noise reduction apparatus.

FIG. 4 shows a block diagram of an image processing apparatus which carries out a circulation type noise reduction operation in accordance with another embodiment of the present invention. In FIG. 4, an input signal from an input terminal 1 is supplied to a memory element 7. The memory element 7 has a comprehensive function of the multipliers 2 and 5 and the adder 3 of the prior art apparatus (FIG. 10). It may comprise a dual port RAM which is used as LUT (Look-Up Table) in the present embodiment. The memory element 7 stores the input data of the input terminal 1 and output data from a unit delay element 4, and also stores sum data of K times data at the input terminal 1 and the (1−K) times the data from the delay element 4.

Accordingly, the number of bits of the address of the memory element 7 should be at least the sum of the number of quantized bits of the input video signal and the number of output bits of the unit delay element 4 which may be a frame memory. For example, where the former is of 8 bits and the latter is of 8 bits, the address of the memory element 7 needs 16 bits (64K). The number of bits of the data of the LUT is selected to be equal to the number of quantized bits. Accordingly, when the number of quantized bits is 8, the memory element 7 requires a capacity of more than 64K×8 bits.

The data of the memory element 7 is updated for each circulative addition. In the example shown in FIG. 4, since the memory element 7 comprises a dual port RAM, the data may be updated in a vertical blanking period of each frame of the video signal. Thus, the value K is modified. In the present embodiment, the value K is set for each time such that the coefficient Kn is equal to 1/n at the n-th circulative addition. As an example, the content of the LUT or the memory element 7 at the second to fourth additions when the number of quantized bits is 2 is shown in Tables 2–4, in which decimal integer notation is used and data is rounded to the nearest whole number at the first order below a decimal point.

TABLE 2

K = 1/2, n = 2
Memory element (7) address

| Input terminal (1) output data | Unit delay element (4) output data | Memory element (7) output data |
|---|---|---|
| 0 | 0 | 0 |
| 0 | 1 | 1 |
| 0 | 2 | 1 |
| 0 | 3 | 2 |
| 1 | 0 | 1 |
| 1 | 1 | 1 |
| 1 | 2 | 2 |
| 1 | 3 | 2 |
| 2 | 0 | 1 |
| 2 | 1 | 2 |
| 2 | 2 | 2 |
| 2 | 3 | 3 |
| 3 | 0 | 2 |
| 3 | 1 | 2 |
| 3 | 2 | 3 |
| 3 | 3 | 3 |

TABLE 3

K = 1/3, n = 3
Memory element (7) address

| Input terminal (1) output data | Unit delay element (4) output data | Memory element (7) output data |
|---|---|---|
| 0 | 0 | 0 |
| 0 | 1 | 1 |
| 0 | 2 | 1 |
| 0 | 3 | 2 |
| 1 | 0 | 0 |
| 1 | 1 | 1 |
| 1 | 2 | 2 |
| 1 | 3 | 2 |
| 2 | 0 | 1 |
| 2 | 1 | 1 |
| 2 | 2 | 2 |
| 2 | 3 | 3 |
| 3 | 0 | 1 |
| 3 | 1 | 2 |
| 3 | 2 | 2 |
| 3 | 3 | 3 |

TABLE 4

K = 1/4, n = 4
Memory element (7) address

| Input terminal (1) output data | Unit delay element (4) output data | Memory element (7) output data |
|---|---|---|
| 0 | 0 | 0 |
| 0 | 1 | 1 |
| 0 | 2 | 2 |
| 0 | 3 | 2 |
| 1 | 0 | 0 |
| 1 | 1 | 1 |
| 1 | 2 | 2 |
| 1 | 3 | 3 |
| 2 | 0 | 1 |
| 2 | 1 | 1 |
| 2 | 2 | 2 |
| 2 | 3 | 3 |
| 3 | 0 | 1 |
| 3 | 1 | 2 |
| 3 | 2 | 2 |
| 3 | 3 | 3 |

In the present embodiment, the consolidated function of the multiplier and the adder of FIG. 10 is attained by the single memory element although the multiplier and the adder may be formed by the memory elements which comprise the LUT. In this case, however, the data of the LUT's must be updated for each circulative addition. Accordingly, the construction by the single memory element as shown in FIG. 4 is easier to control.

Figure 11:
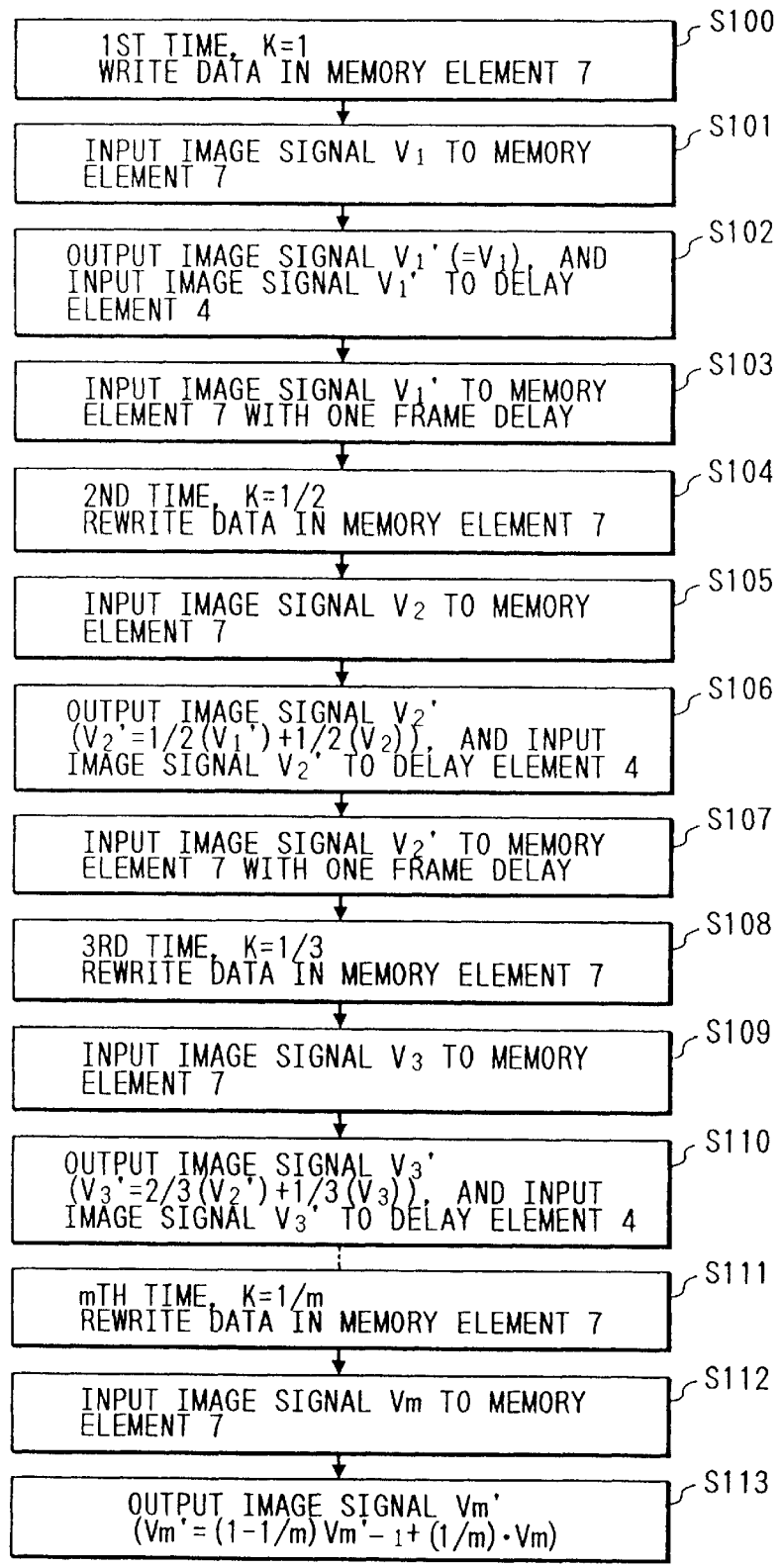
FIG. 11 shows a flow chart for illustrating the control in a first embodiment of the present invention.

The control in the apparatus of FIG. 4 is now explained with reference to a flow chart of FIG. 11. In the initial state, the data K=1 is written into the memory element 7 (step 101). In this state, a video signal $V_1$ is applied from the input terminal 1 to the memory element 7 (step 101) and a video signal $V_1'(=V_1)$ is outputted from the memory element 7. The video signal $V_1'$ is outputted from the output terminal 6 and applied to the unit delay element 4 (step 102). The video signal $V_1'$ stored in the unit delay element 4 is applied to the memory element 7 after one frame of delay (step 103) and the data of the memory element 7 is updated into the data (LUT in Table 2) for the second circulative addition during the vertical blanking period (step 104).

Then, the video signal $V_2$ is applied from the input terminal to the memory element (step 105) and the video signal $V_2'(=(\frac{1}{2})V_1'+(\frac{1}{2})V_2)$ is outputted by looking up the LUT of the memory element 7. The video signal $V_2'$ is outputted from the output terminal 6 and applied to the unit delay element 4 (step 106) as it is in the first integration, and it is applied to the memory element 7 after one frame of delay (step 107). The data in the memory element 7 is updated into the data (LUT of Table 3) for the third circulative addition during the vertical blanking period (step 108) and a video signal $V_3$ is applied to the memory element 7 having the data updated (step 109). The circulative addition is made by repeating the above operation, and at the m-th addition, the data of the memory element 7 is updated into the data for K=1/m (step 111), and then the video signal $V_m$ is supplied to the memory element (step 112). Then, the video signal $V_m'$ is outputted by looking up the LUT of the memory element 7 (step 113).

Another embodiment of the present invention is now explained with reference to FIG. 5.

Figure 5:
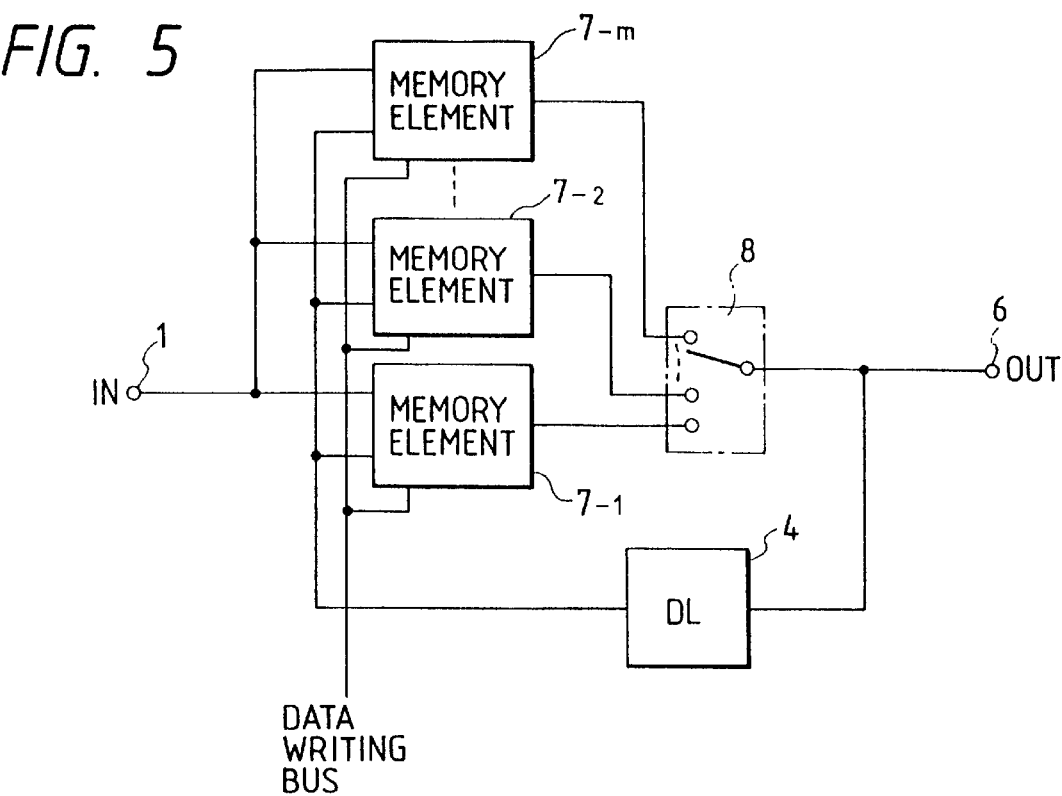
FIG. 5 shows a block diagram of a configuration of another embodiment of an image processing apparatus in accordance with the second aspect of the present invention.
Figure 6:
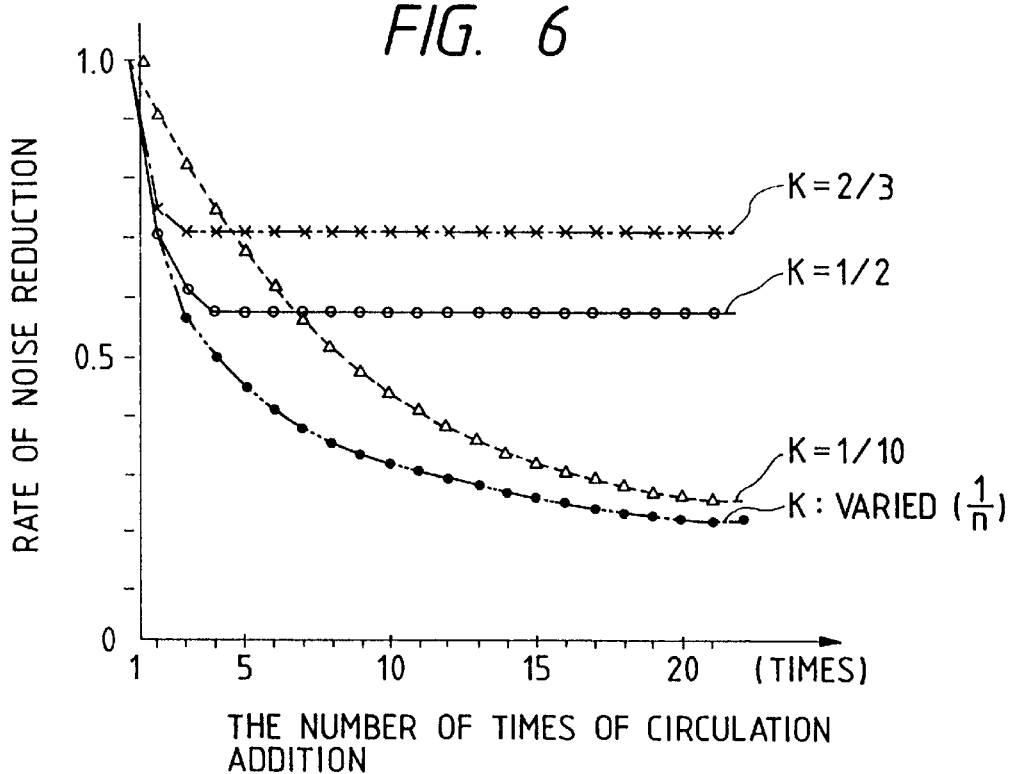
FIG. 6 shows a graph of a relation between the number of times of circulative addition and the degree of noise reduction when K is fixed and when K is variable ($K_n=1/n$)
Figure 7:
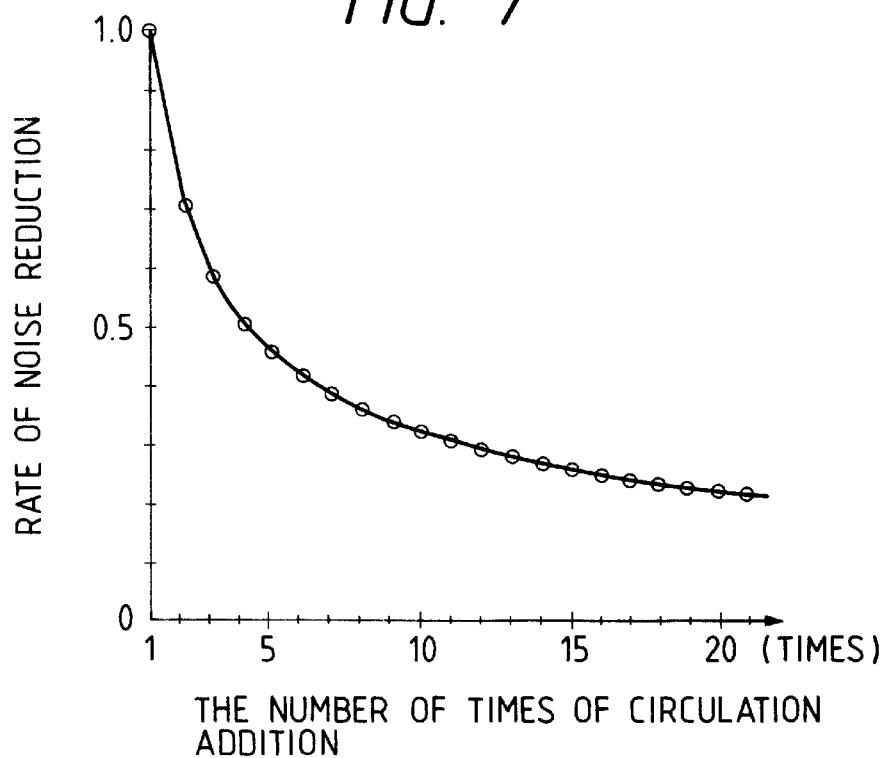
FIG. 7 shows a graph of a relation between the number of times of circulative addition and the degree of noise reduction when K is varied as shown in (a) of Table 1.
Figure 8:
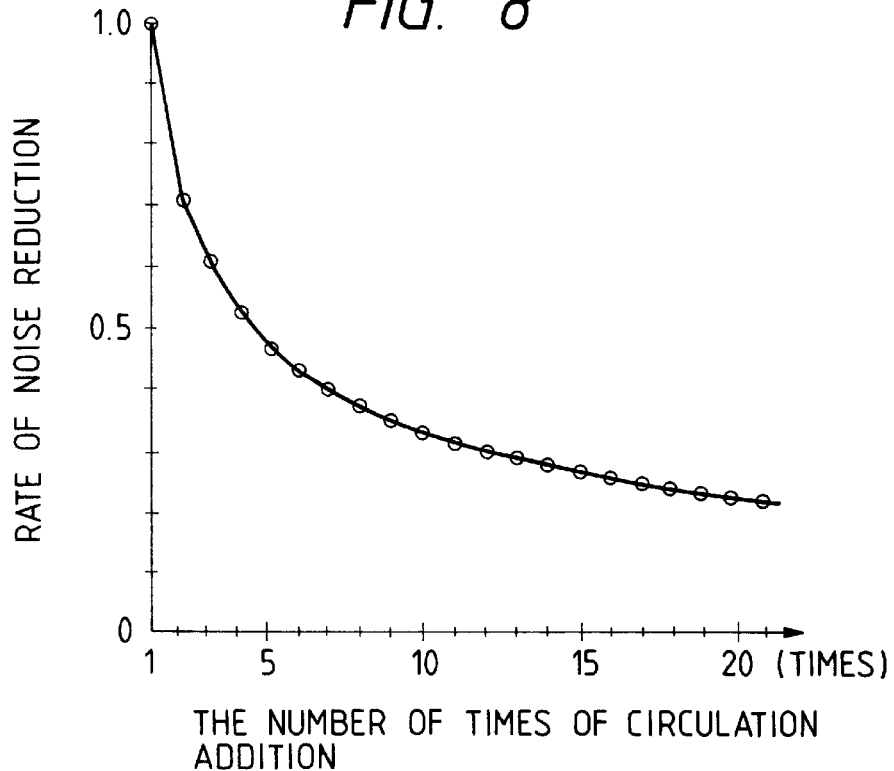
FIG. 8 shows a graph of a relation between the number of times of circulative addition and the degree of noise reduction when K is varied as shown in (b) of Table 1.
Figure 9:
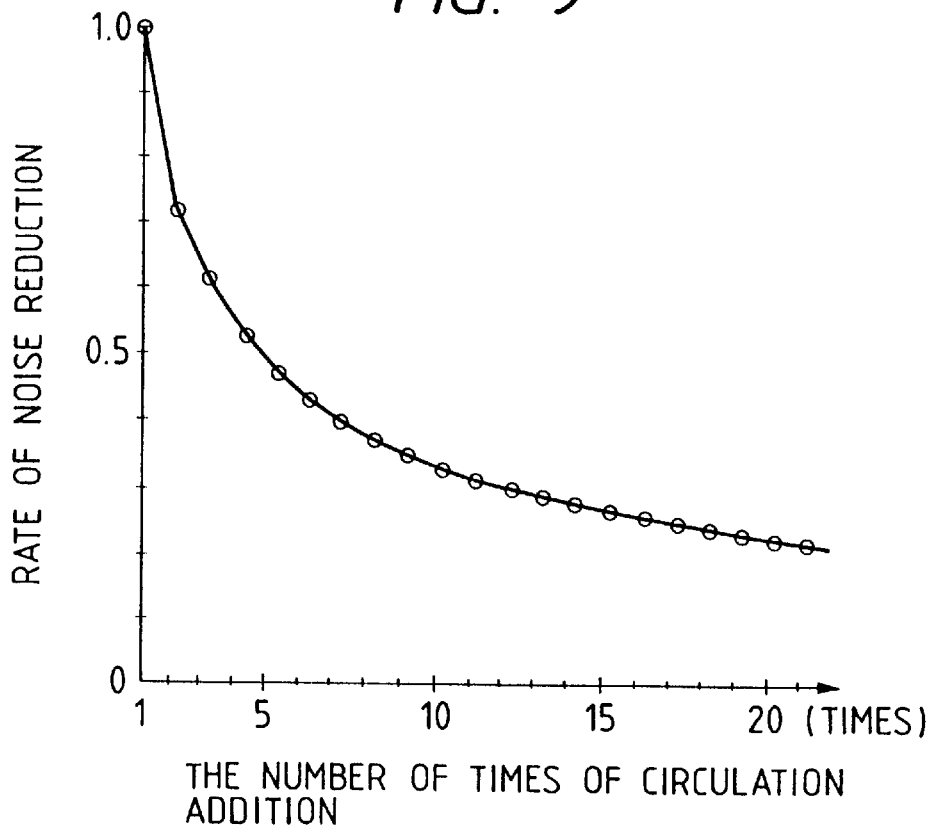
FIG. 9 shows a graph of a relation between the number of times of circulative addition and the degree of noise reduction when K is varied as shown in (c) of Table 1.

In the embodiment of FIG. 5, a plurality of memory elements are provided and m LUT's for K=1, ½, ⅓, . . . , 1/m are prepared. For each circulative addition, the output of the memory element 7 which has the LUT of the corresponding K value is selected by selection means 8. In such a configuration, a data write path shown in FIG. 5 may be omitted if the LUT's (memory elements) can be provided without restriction to the number.

However, since the number of memory elements is actually limited, it is necessary to sequentially update the data of the memory elements 7. If the update of the memory elements 7 cannot be completed in the vertical blanking period, the data of the memory elements $7_{-1}$ to $7_{-m-1}$ may be updated while one of the LUT's, for example the memory element $7_{-m}$ is selected by the selection means 8. In this manner, the need to provide a number of memory elements 7 is eliminated.

Figure 12:
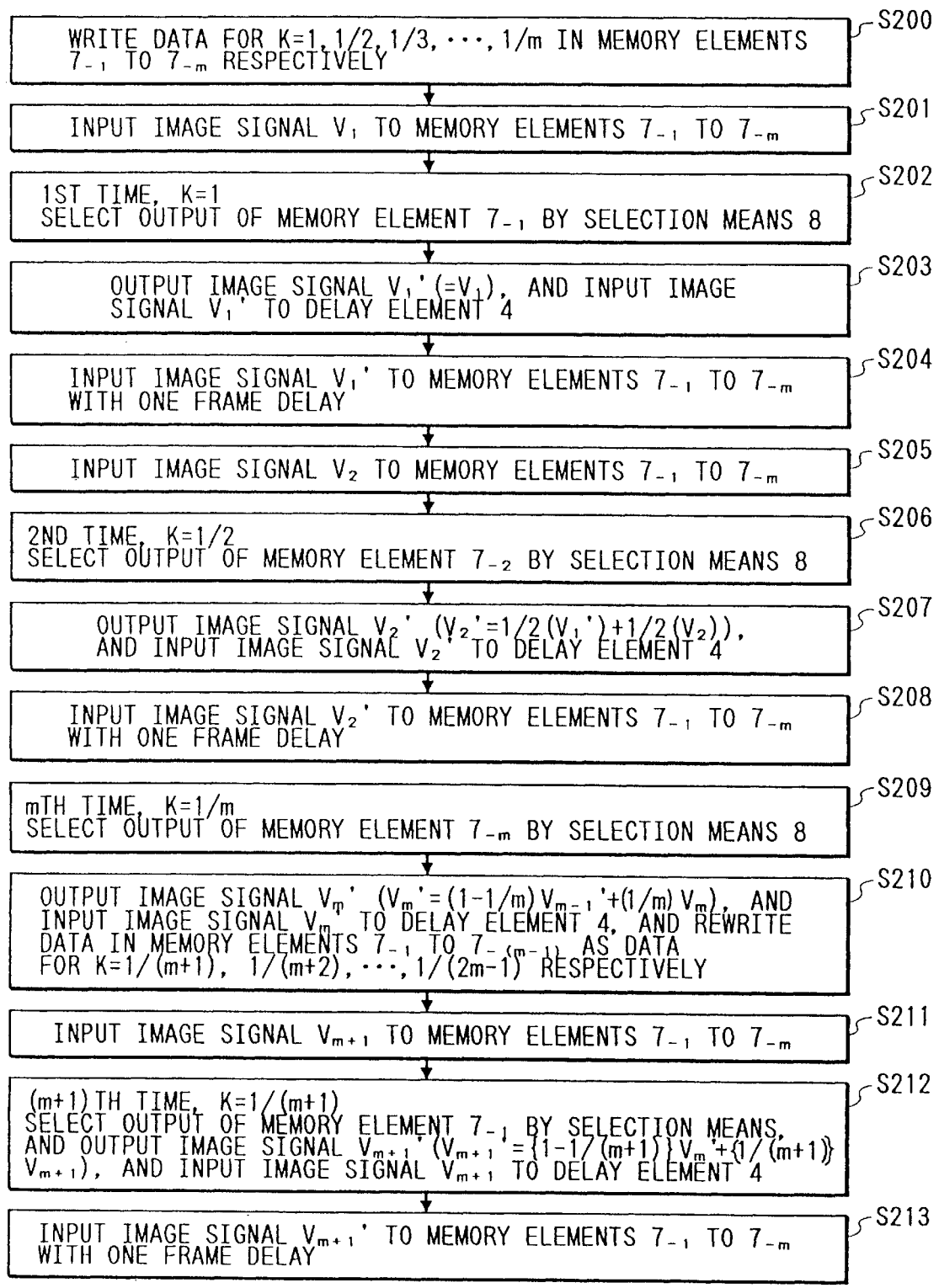
FIG. 12 shows a flow chart for illustrating the control in a second embodiment of the present invention.

The control of the apparatus of FIG. 5 is now explained with reference to FIG. 12.

First, data for K=1, ½, ⅓, . . . , 1/m are written into the memory elements $7_{-1}$ to $7_{-m}$, respectively (step 200). Then, the video signal $V_1$ is applied to the memory means $7_{-1}$ to $7_{-m}$ (step 201). In the first circulative addition, the output of the memory element $7_{-1}$ is selected by the selection means 8 (step 202), and the video signal $V_1'(=V_1)$ is outputted from the output terminal 6 and applied to the unit delay element 4 (step 203). The video signal $V_1'$ stored in the unit delay element 4 is applied to the memory elements $7_{-1}$ to $7_{-m}$ after one frame of delay (step 204).

Then, the video signal $V_2$ is applied to the memory elements $7_{-1}$ to $7_{-m}$ (step 205) and the output of the memory means $7_{-2}$ is selected (step 206). The video signal $V_2'(=(½)V_1'+(½)V_2)$ from the memory means $7_{-2}$ is outputted from the output terminal 6 and applied to the unit delay element 4 (step 207) as it is for the first addition, and it is applied to the memory elements $7_{-1}$ to $7_{-m}$ after one frame of delay (step 208).

The above operation is repeated and at the m-th circulative addition, the output (K=1/m) of the memory element $7_{-m}$ is selected by the selection means 8 (step 209). The video signal $V_m$ is outputted from the output terminal 6 and applied to the unit delay element 4. In parallel thereto, the data for the LUT's of the memory elements $7_{-1}$ to $7_{-m}$ are updated into the data for K=1/(m+1), 1/(m+2), . . . , 1/(2m−1) by the data write bus (step 210).

Then, the video signal $V_{m+1}$ is applied to the memory elements $7_{-1}$ to $7_{-m}$ (step 211), and the memory element $7_{-1}$ is selected by the selection means 8. The video signal $V'_{m+1}(=\{1-1/(m+1)\}V_m'+\{1/(m+1)\}V_{m+1})$ from the memory element $7_{-1}$ is outputted from the output terminal and applied to the unit delay element (step 212). The video signal $V_{m+1}$ is applied to the memory elements $7_{-1}$ to $7_{-m}$ after one frame of delay as it was in the previous additions (step 213). In the (m+1)th and subsequent additions, the circulative addition is made in the same manner.

In the above embodiments, Kn=1/n. Alternatively, K may be set to meet the following conditions in the apparatus of FIGS. 4 and 5.

1) The coefficient at the initial state is "1".

2) The coefficient at the $2^x$th (where x is a positive integer) circulative addition is $½^x$.

3) A relation of $K_{n+1} \leq K_n$ is met between the coefficient $K_n$ in the n-th (where n is a positive integer) circulative addition and the coefficient K in the (n+1)th circulative addition.

As seen from FIG. 6 and FIGS. 7–9, as the number of times of circulative addition increases, the degree of noise reduction converges and the effects of updating of the LUT's and the circulative addition decrease. Accordingly, the content of the LUT may be fixed when the noise component of the output signal from the image processing apparatus of the present invention which carries out the noise reduction operation falls below a predetermined level. In this manner, a definite number of LUT's may be used and the configuration is simplified. The detection of the noise level may be made by comparing the input and the output of the unit delay element 4 of FIGS. 4 and 5 to check whether the difference is within a predetermined level. Alternatively, whether an integration of the difference between the input and the output of the unit delay element 4 over a unit period is below a predetermined level or not may be determined. In FIG. 6 and FIGS. 7–9, the degree of noise reduction substantially converges at the eighth circulative addition. Accordingly, instead of detecting the noise level, K in the ninth and subsequent additions may be fixed by K at the eighth addition. As seen from FIG. 6 and FIGS. 7–9, the noise level is reduced to less than ½ at the fourth circulative addition. Accordingly, K in the fifth and subsequent circulative addition may be fixed to K at the fourth circulative addition. In this manner, the number of times at which the value K is fixed may be predetermined.

In accordance with the image processing apparatus in the second aspect of the present invention, the operation coefficient which was fixed in the prior art is variable. Accordingly, the convergence of the degree of noise reduction if faster and the convergence value is smaller than those of the prior art. Accordingly, the present invention permits faster and more sufficient reduction of the noise component of the still image (still area).

What is claimed is:

1. An image signal processing apparatus, comprising:

means for inputting an image signal from an image pickup device;

means for inputting a signal indicating a stop value of said image pickup device;

number of times of integration determination means for determining a number of times of integration of said image signal based on said stop value;

integration means for integrating said image signal by the number of times of integration determined by said number of times of integration determination means and outputting an integrated image signal; and modification means for modifying the integrated image signal for each integration in accordance with the current number of times of integration and said stop value, and for outputting the modified signal.

2. An image processing apparatus according to claim 1, wherein said modification means includes means for modifying the integrated image signal for each integration by a factor of $2^a/n$, where a is said stop value of said image pickup device and n is the current number of times of integration.

3. An image signal processing apparatus according to claim 1, wherein said modification means modifies said integrated image signal such that the modified signal is maintained at a substantially constant level regardless of the number of times said image signal has been integrated.

4. An image signal processing apparatus for processing an image signal obtained from an image pickup device which picks an image of a still object, comprising:

number of times of integration determination means for determining a number of times of integration of said image signal based on stop information representing a stop value of said image pickup device;

integration means for integrating said image signal based on said number of times of integration and outputting an integrated image signal; and modification means for modifying the integrated image signal in accordance with said stop information and a current number of times of integration of said image signal not exceeding the determined number of times of integration, and for outputting the modified signal.

5. An image signal processing apparatus according to claim 4, wherein said number of times of integration determination means includes means for setting said number of times of integration to $2^a$, where $\underline{a}$ is a stop value of said image pickup device.

6. An image signal processing apparatus according to claim 5, wherein said modification means reduces the integrated image signal by a factor of $\underline{n}$, where $\underline{n}$ is the current number of times of integration not exceeding the determined number of times of integration.

7. An image signal processing apparatus according to claim 4, wherein said modification means modifies said integrated image signal such that the modified signal is maintained at a substantially constant level regardless of the number of times said image signal has been integrated.

8. An image signal processing apparatus, comprising:

means for inputting an image signal from an image pickup device;

means for inputting a signal indicating a stop value of said image pickup device;

number of times of integration determination means for determining a number of times of integration N of said image signal based on said stop value;

integration means for integrating said image signal by the number of times of integration N determined by said number of times of integration determination means and outputting an integrated image signal for each integration;

compensation coefficient determining means for determining an n-th compensation coefficient corresponding to a difference between an N-th integrated image signal and an n-th integrated image signal, for n=1 to N, each compensation coefficient being determined based on the corresponding number n and said stop value; and compensation means for compensating the n-th integrated image signal by an amount depending upon the n-th compensation coefficient.

9. An image processing apparatus according to claim 8, wherein the n-th compensation coefficient is $2^a/n$, where a is said stop value of said image pickup device.

10. An image signal processing apparatus according to claim 8, wherein all of said integrated image signals have substantially the same level after compensation by said compensation means.

11. An image signal processing apparatus for processing an image signal obtained from an image pickup device which picks an image of a still object, comprising:

number of times of integration determination means for determining a number of times of integration N of said image signal based on stop information representing a stop value of said image pickup device;

integration means for integrating said image signal by said number of times of integration N and outputting an integrated image signal for each integration;

compensation coefficient determining means for determining an n-th compensation coefficient corresponding to a difference between an N-th integrated image signal and an n-th integrated image signal, for n=1 to N, each compensation coefficient being determined based on said atop information and the corresponding number n; and compensation means for compensating the n-th integrated image signal by an amount dependent upon the n-th compensation coefficient.

12. An image signal processing apparatus according to claim 11, wherein the n-th compensation coefficient is inversely proportional to n.

13. An image signal processing apparatus according to claim 11, wherein all of said integrated image signals have substantially the same level after compensation by said compensation means.

14. A method for correcting an output of an image signal processing apparatus, comprising the steps of:

inputting an image signal from an image pickup device;

inputting a signal indicative of a stop value of the image pickup device;

determining a number of times of integration N based on said stop value;

determining an n-th compensation coefficient corresponding to a difference between an N-th integrated image signal and an n-th integrated image signal (where $1 \leq n \leq N$), based on said stop value and the corresponding number n; and compensating an integrated image signal obtained by integrating the image signal n-times, by an amount depending upon the n-th compensation coefficient.

* * * * *